United States Patent [19]
Kim et al.

[11] Patent Number: 5,937,059
[45] Date of Patent: Aug. 10, 1999

[54] DTMF DETECTOR FOR DETECTING DTMF SIGNALS USING A DIGITAL SIGNAL PROCESSING CHIP AND METHOD THEREOF

[75] Inventors: Nam-Sun Kim; Young-Ky Kim, both of Seoul; Yoon-Seok Kang, Seongnam; Ho-Young Park, Seoul, all of Rep. of Korea

[73] Assignee: SamSung Electronics Co., Ltd., Kyungki-do, Rep. of Korea

[21] Appl. No.: 08/752,426

[22] Filed: Nov. 19, 1996

[30] Foreign Application Priority Data

Nov. 20, 1995 [KR] Rep. of Korea ............... 95-42260

[51] Int. Cl.$^6$ .............. H04M 1/00; H04M 3/00
[52] U.S. Cl. ................ 379/386; 379/283; 379/339
[58] Field of Search ................ 379/386, 338, 379/339, 341, 353, 286, 283

[56] References Cited

U.S. PATENT DOCUMENTS

| | | |
|---|---|---|
| 4,484,035 | 11/1984 | Graham et al. . |
| 4,550,425 | 10/1985 | Anderson et al. ............ 702/212 |
| 4,669,114 | 5/1987 | Reesor et al. ............... 379/257 |
| 4,689,760 | 8/1987 | Lee et al. ................. 370/110.3 |
| 4,833,399 | 5/1989 | So ................................. 324/79 |
| 4,853,958 | 8/1989 | Rabipour et al. ............ 379/386 |
| 5,119,322 | 6/1992 | Stroobach ................ 364/724.09 |
| 5,163,050 | 11/1992 | Cromack ................... 379/110.3 |
| 5,172,406 | 12/1992 | Locke . |
| 5,214,693 | 5/1993 | Chujo ........................... 379/386 |
| 5,333,191 | 7/1994 | McCarthy .................... 379/283 |
| 5,353,345 | 10/1994 | Galand ......................... 379/386 |
| 5,408,529 | 4/1995 | Greaves ........................ 379/386 |
| 5,428,680 | 6/1995 | Murata et al. ................ 379/386 |
| 5,459,781 | 10/1995 | Kaplan et al. ................ 379/351 |
| 5,459,784 | 10/1995 | Tzeng ........................... 379/386 |
| 5,535,271 | 7/1996 | Jangi et al. ................... 379/351 |
| 5,588,053 | 12/1996 | Xie ............................... 379/386 |
| 5,619,564 | 4/1997 | Canniff et al. ............... 379/386 |
| 5,644,634 | 7/1997 | Xie et al. ..................... 379/386 |
| 5,694,466 | 12/1997 | Xie et al. ..................... 379/386 |

Primary Examiner—Reinhard J. Eisenzopf
Assistant Examiner—Charles N. Appiah
Attorney, Agent, or Firm—Robert E. Bushnell, Esq.

[57] ABSTRACT

A dual tone multi-frequency detector includes a pulse code modulation expanding unit for converting pulse code modulation data into linear data. A correlating unit constructed from a plurality of correlators correlates the linear data with a plurality of predetermined reference signals to generate a plurality of power values of a frequency band corresponding to dual tone multi-frequency signals. A total power detecting unit detects a total power value of the linear data. A low frequency maximum power detecting unit detects a maximum low frequency power value from the power values of a low frequency band generated by the correlating unit. A high frequency maximum power detecting unit detects a maximum high frequency power value from the power values of a high frequency band generated by the correlating unit. A deciding unit decides whether or not the pulse code modulation data represents a dual tone multi-frequency signal in dependence upon the total power value, the maximum low frequency power value and the maximum high frequency power value.

20 Claims, 4 Drawing Sheets

DTMF DETECTOR FOR DETECTING DTMF SIGNALS USING A DIGITAL SIGNAL PROCESSING CHIP AND METHOD THEREOF

CROSS-REFERENCE TO RELATED APPLICATIONS

This application makes reference to, incorporates the same herein, and claims all benefits accruing under 35 U.S.C. §119 arising from an application for *DTMF Detector For Detecting DTMF Signals Using A Digital Signal Processing Chip And Method Thereof* earlier filed in the Korean Industrial Property Office on 20 Nov. 1995 and there duly assigned Ser. No. 42260/1995.

BACKGROUND OF THE INVENTION

The present invention relates to dual tone multi-frequency (hereinafter, "DTMF") detectors, and more particularly, to a DTMF detector for detecting a DTMF signal of 15 channels by using a digital signal processing (hereinafter, "DSP") chip.

A DTMF signal is a signal that includes two elemental signal tones each having a different frequency. A signal generated from a push-button telephone terminal is a typical example of a DTMF signal. In the United States, DTMF signalling usually employs one tone in a high frequency group (i.e., 1209, 1336, 1477 and 1633 Hz), and one tone from a lower frequency group (i.e., 697, 770, 852 and 941 Hz).

Several techniques for detecting DTMF signals exist in the prior art. One reference, U.S. Pat. No. 5,333,191 entitled *Detection Of Multi-Frequency Tone Signals* issued to McCarthy, discloses a method of operating a digital signal processor to detect DTMF tones in a digital voice telephone system in which digitally encoded signals appearing on a telephone channel are decimated to compress the spectrum to be monitored for the appearance of call signalling tones.

Another reference, U.S. Pat. No. 5,172,406 entitled *DTMF Signal Detection Apparatus* issued to Locke, discloses an apparatus for detecting and identifying DTMF signals in connection with voice store and forward (VSF) equipment. Locke '406 seeks to avoid the corruption of DTMF signals that are generated by a user while the voice store and forward VSF) equipment is transmitting signals (i.e., voice prompts or stored messages) to the user. While the foregoing prior art provides benefits in its own right, we believe that an improved technique for detecting DTMF signals can be contemplated.

SUMMARY OF THE INVENTION

Therefore, it is an object of the present invention to provide an improved DTMF detector for detecting a DTMF signal in real-time.

It is another object to provide a DTMF detector for detecting a DTMF signal transmitted over multiple channels in real-time by using a single DSP chip and an embodied method thereof.

It is still another object to provide a DTMF detector capable of calculating the power level of a DTMF frequency.

It is yet another object to provide a DTMF detector by constructing a DTMF frequency power detector having a correlator structure and an embodied method thereof.

These and other objects can be achieved in accordance with the principles of the present invention with a dual tone multi-frequency detector having a pulse code modulation expanding unit for converting pulse code modulation data into linear data. A correlating unit constructed from a plurality of correlators correlates the linear data with a plurality of predetermined reference signals to generate a plurality of power values of a frequency band corresponding to dual tone multi-frequency signals. A total power detecting unit detects a total power value of the linear data. A low frequency maximum power detecting unit detects a maximum low frequency power value from the power values of a low frequency band generated by the correlating unit. A high frequency maximum power detecting unit detects a maximum high frequency power value from the power values of a high frequency band generated by the correlating unit. A deciding unit decides whether or not the pulse code modulation data represents a dual tone multi-frequency signal in dependence upon the total power value, the maximum low frequency power value and the maximum high frequency power value.

The present invention further provides a method for detecting a dual tone multi-frequency signal, including the steps of: converting pulse code modulation data into linear data; correlating said linear data with a plurality of predetermined reference signals to detect a plurality of power values of a frequency band corresponding to dual tone multi-frequency signals; detecting a total power value of said linear data; detecting a maximum low frequency power value from said power values of a low frequency band; detecting a maximum high frequency power value from said power values of a high frequency band; and determining whether or not said pulse code modulation data represents a dual tone multi-frequency signal in dependence upon said total power value, said maximum low frequency power value and said maximum high frequency power value.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
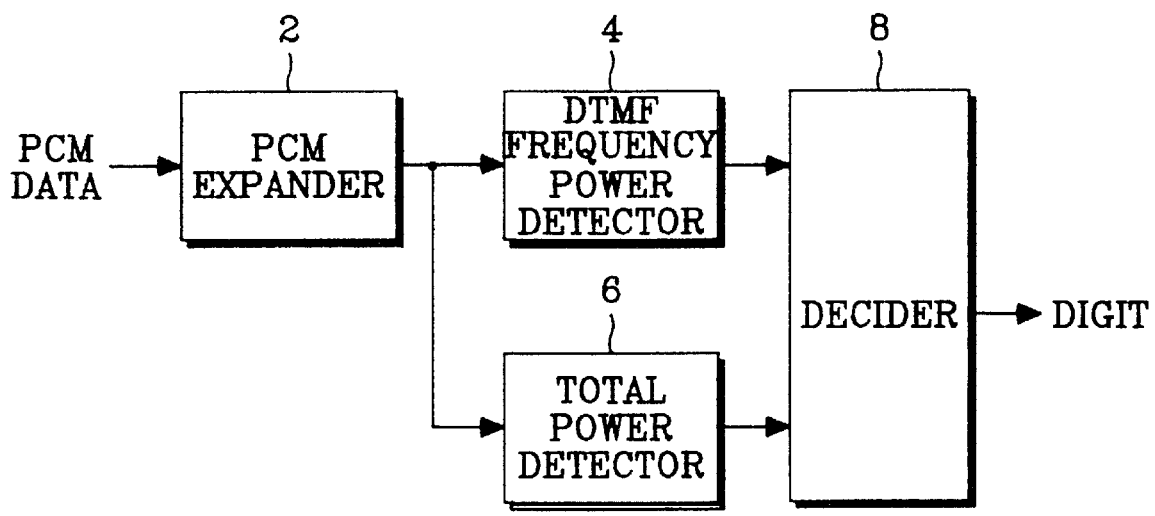
FIG. 1 is a block diagram showing an abstract representation of a DTMF detector.

Turning now to the drawings and referring to FIG. 1, a block diagram showing an abstract representation of a DTMF detector is provided. The DTMF detector of FIG. 1 includes a pulse code modulation (hereinafter, "PCM") expander 2 for converting PCM data to linear data. A DTMF frequency power detector 4 detects the power level of each frequency of a DTMF signal. A total power detector 6 detects the total power level of a DTMF signal. A decider 8 decides whether or not an input signal is a DTMF signal by using the power level values detected by DTMF frequency power detector 4 and total power detector 4, and further decides what digit is represented by the DTMF signal. Decider 8 satisfies a Consultative Committee for International Telegraphy and Telephony (hereinafter, "CCITT") specification, and includes circuitry for implementing a twist check and an interruption check.

Figure 2:
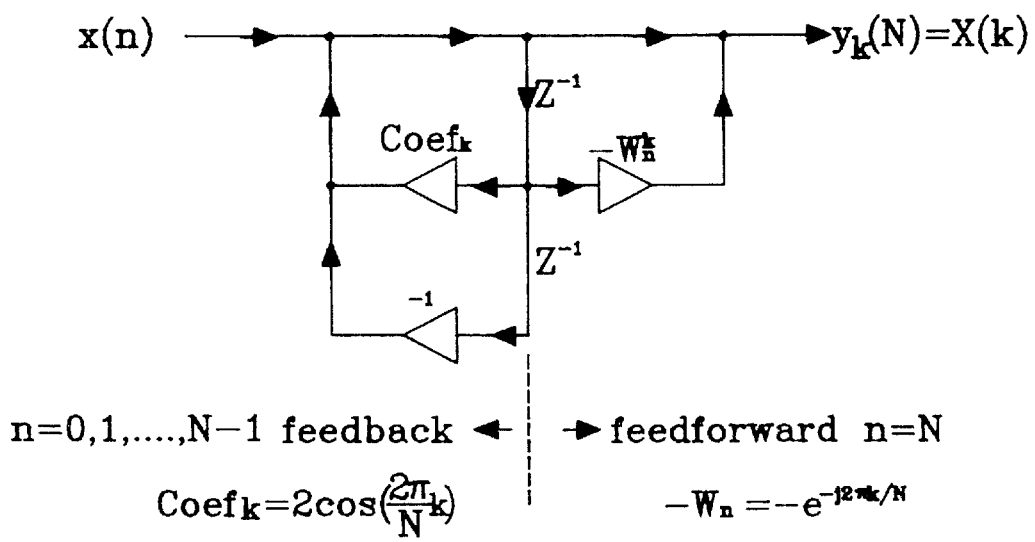
FIG. 2 is a diagram showing the Goertzel algorithm.

In FIG. 1, the DTMF frequency power detector 4 calculates the power level of each DTMF frequency by using a second order infinite impulse response (hereinafter, "IIR") filter or a bandpass filter which applies a Goertzel algorithm to an input DTMF signal. The Goertzel algorithm is depicted in FIG. 2, and is described in a book entitled *"Discrete Time Signal Processing"*, pp. 585–587, Prentice-Hall, 1989.

After the power level of each DTMF frequency and the total power level of the DTMF signal are calculated by the DTMF frequency power detector 4 and the total power detector 6 respectively, the decider 8 compares the ratio of the power level of each DTMF frequency to the total power level of the DTMF signal, with a predetermined threshold value. When the ratio of the power level of each DTMF frequency to the total power level is greater than the threshold value, the twist check and the interruption check are executed. If these checking conditions are satisfied, the input signal is determined to be a DTMF signal.

Since the DTMF frequency power detector 4 of FIG. 1 is embodied using a second order IIR filter or bandpass filter applying the Goertzel algorithm a large amount of calculation is required. Therefore, the DTMF detector of FIG. 1 requires several DSP chips, or a single DSP chip having a large amount of processing power in order to process a multi-channel DTMF signal in real-time.

Figure 3:
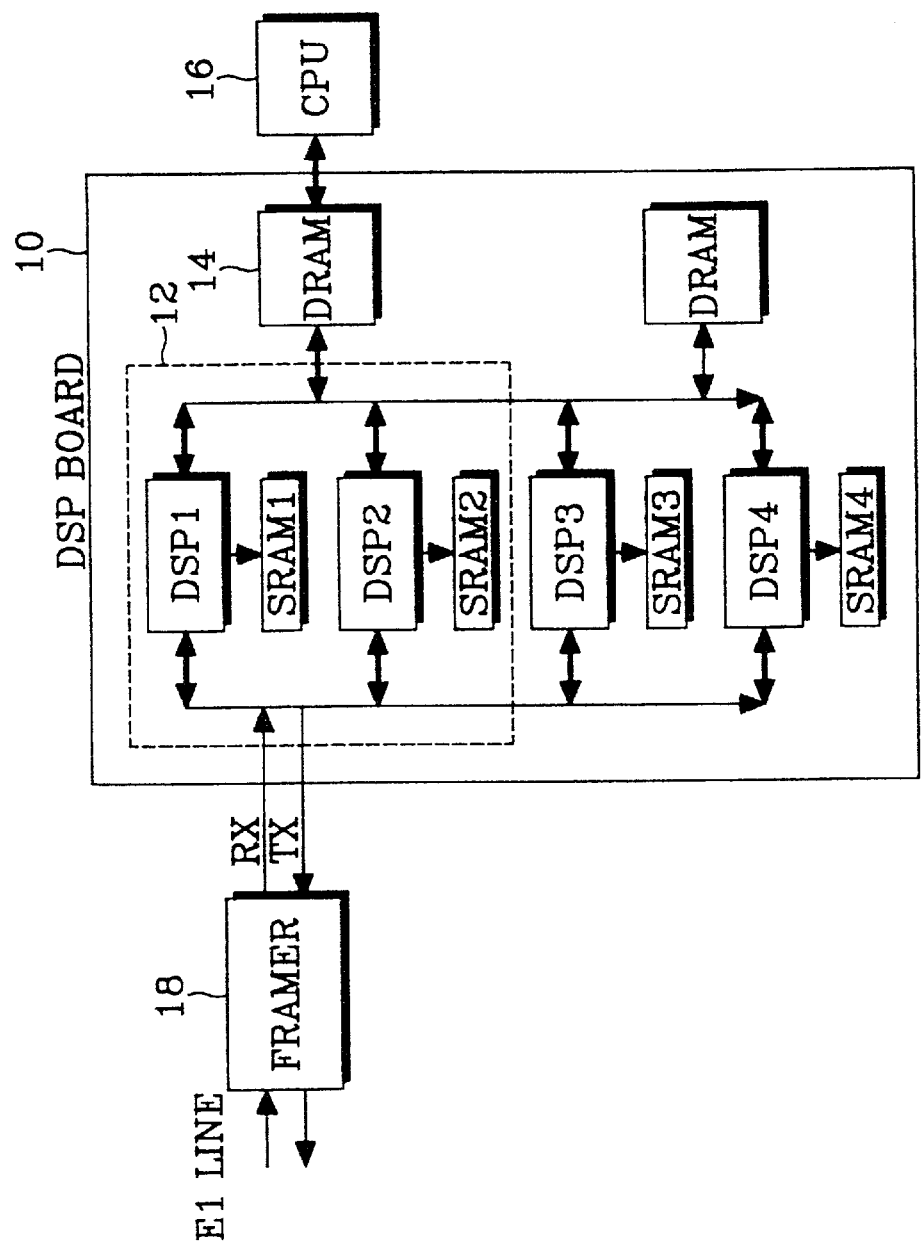
FIG. 3 is a block diagram showing the construction of a DSP board including a DTMF detector.

Referring now to FIG. 3, a block diagram showing the construction of a DSP board including a DTMF detector is provided. In FIG. 3, a DSP board 10 contains four (4) DSP chips, DSP1 through DSP4. Among the DSP chips, DSP1 and DSP2 are embodied as a DTMF detector 12 indicated by the dotted line. Each one of the DSP chips, DSP1 through DSP4, is capable of processing 15 channels. Each DSP chip may be embodied using a floating point DSP chip, such as a TMS320C31 chip, capable of executing 25 million instructions per second (MIPS), so that a DTMF signal can be processed in real-time.

A DSP clock of 50 MHz, a system clock of 200 Hz and a timer clock of 1 KHz are supplied to each DSP chip of the DSP board 10. Each DSP chip utilizes a timer interrupt for communicating with a central processing unit (CPU) 16 (e.g., MC68030) and implements assigned work by the control of CPU 16. After a call is completed, the DSP chips DSP1 and DSP2, that is, the DTMF detector 12, are switched into a mode for detecting a DTMF signal. Thereafter, PCM data input through an E1 line is processed every five (5) milliseconds.

The PCM data input through the E1 digital trunk is supplied to a DSP serial port via a framer 18. The DSP chips DSP1 and DSP2 detect a DTMF signal from signals supplied to 15 voice channels among 30 channels of the E1 line. An algorithm for the DTMF detector 12 is stored in static random access memories (hereinafter, "SRAMs"), namely SRAM1 and SRAM2. When detecting a DTMF signal, the DTMF detector 12 is controlled by CPU 16 through a dynamic random access memory (hereinafter, "DRAM") 14. DSP board 10 may also include another DRAM, as shown. Moreover, the DSP chips DSP3 AND DSP4 have corresponding SRAMs, namely SRAM3 and SRAM4.

Figure 4:
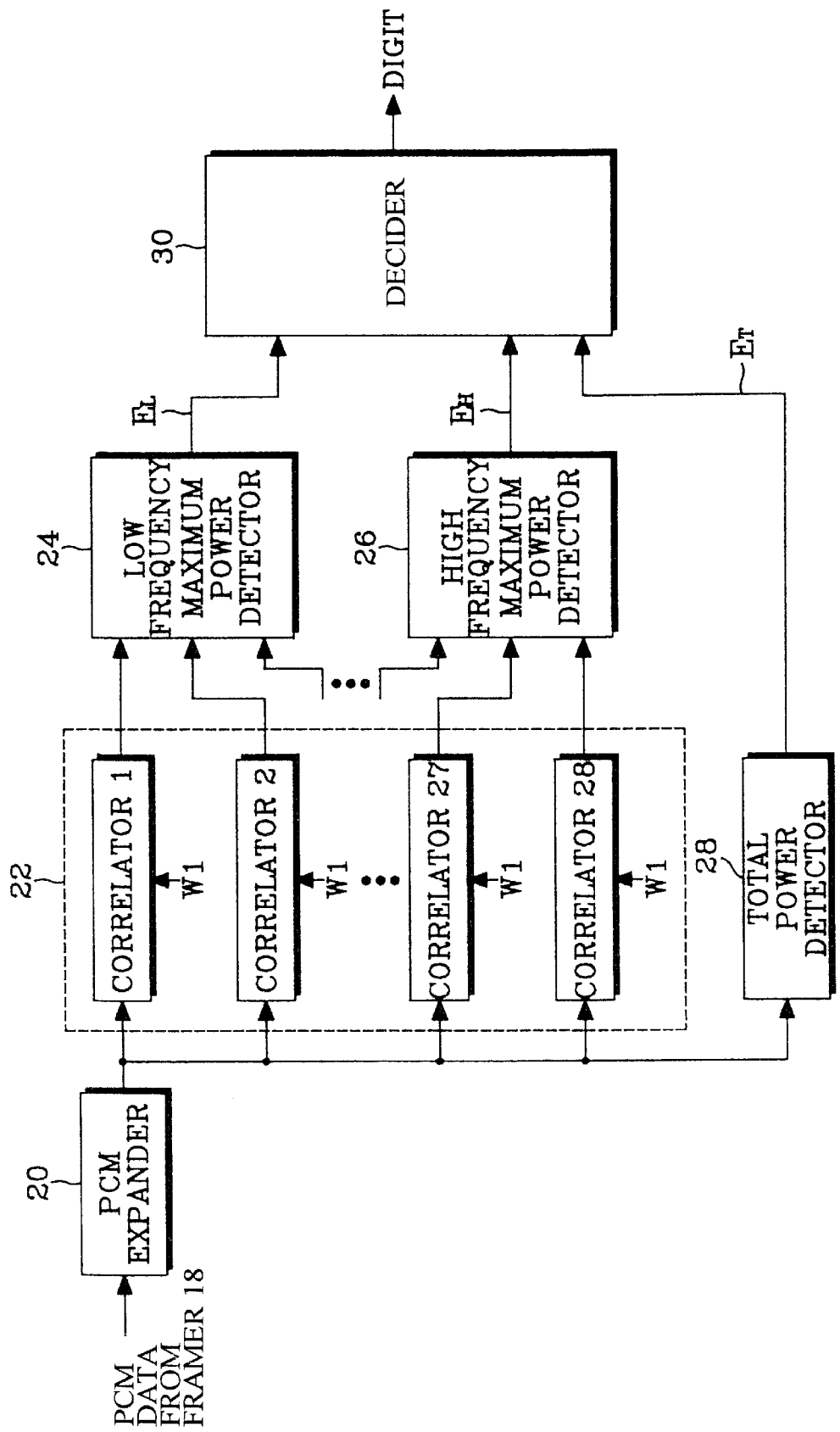
FIG. 4 is a block diagram showing a DSP chip constructed according to the principles of the present invention.

FIG. 4 is a block diagram showing a DSP chip constructed according to the principles of the present invention. In FIG. 4, a PCM expander 20 converts the PCM data (received from framer 18 in FIG. 3) into linear PCM data. A correlator circuit 22 detects the power level of each frequency of a DTMF signal included within the linear PCM data. A total power detector 28 detects the total power level of the DTMF signal. A low frequency maximum power detector 24 receives outputs from correlators of the correlator circuit 22, and detects the maximum power level of frequencies of a low frequency band. A high frequency maximum power detector 26 receives outputs from correlators of the correlator circuit 22, and detects the maximum power level of frequencies of a high frequency band. A decider 30 decides whether or not a signal is a DTMF signal by using the power level values output from the total power detector 28, the low frequency maximum power detector 24 and the high frequency maximum power detector 26. Decider 30 satisfies the CCITT specification, and includes circuitry for implementing a twist check and an interruption check.

Referring now to FIGS. 3 and 4, the PCM data (including the DTMF signal) passing through the framer 18 from the T1/E1 line is compressed according to $\mu$-law or A-law. This compressed data is then applied to each DSP chip. Within each DSP chip, the PCM expander 20 of FIG. 4 expands the compressed data to linear PCM data for processing by the DSP chip. To expand the data, $2^8$ conversion tables are used. The expanded data output from PCM expander 20 is applied to each correlator within the correlator circuit 22, and is also applied to the total power detector 28. Correlator circuit 22 preferably includes twenty-eight (28) correlators (i.e., correlator 1, correlator 2, correlator 3 . . . correlator 28), and detects the power level of each frequency of the DTMF signal from the data provided from PCM expander 20.

Figure 5:
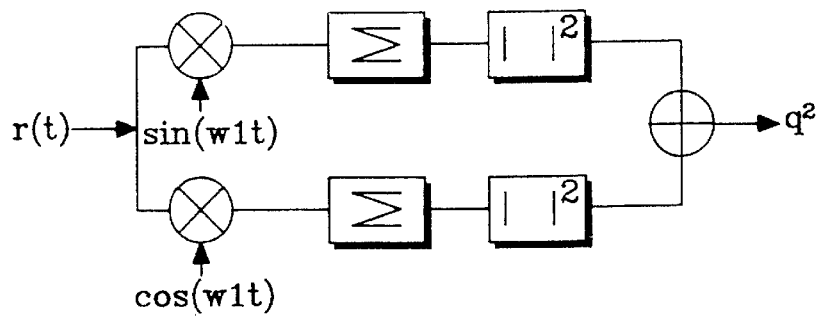
FIG. 5 is a diagram showing the conceptual construction of each correlator within the correlator circuit of FIG. 4.

FIG. 5 shows the conceptual construction of each correlator within the correlator circuit 22. The correlator shown in FIG. 5 has a non-coherent detector structure. The structure of each correlator is expressed by the following equation (1):

$$q^2 = \left[ \int_0^T (r(t) \times \sin(w_1 t)) dt \right]^2 + \left[ \int_0^T (r(t)) \times \cos(w_1 t)) dt \right]^2 \quad (1)$$

where r(t) is an input signal, $q^2$ is an output signal, and $w_1$ is a reference frequency being detected in the particular correlator. The output signal $q^2$ is a function irrelevant to a phase of the input signal r(t).

If the input signal r(t) is expressed by the following equation (2) as a function of a frequency $w_2$ and a phase $\Theta$, the output signal $q^2$ is given by the following equation (3):

$$r(t) = \sin(w_2 t + \theta) \quad (2)$$

$$q^2 = \left[ \int_0^T (\sin(w_2 t + \theta) \times \sin(w_1 t)) dt \right]^2 + \left[ \int_0^T (\sin(w_2 t + \theta) \times \cos(w_1 t)) dt \right]^2 \quad (3)$$

where $w_2$ is $2\pi f$.

In equation (3), the output signal $q^2$ is a function of a difference $(w_2-w_1)$ between the frequency $w_2$ of the input signal r(t) and the reference frequency $w_1$, and has an output of a sinc function. The output signal $q^2$ is defined as the power level of the input signal r(t) at the reference frequency $w_1$.

As shown in FIG. 5, each correlator within the correlator circuit 22 is constructed using an arrangement of mixers, adders and absolute value squaring circuits, as will be explained with reference to FIG. 6.

Figure 6:
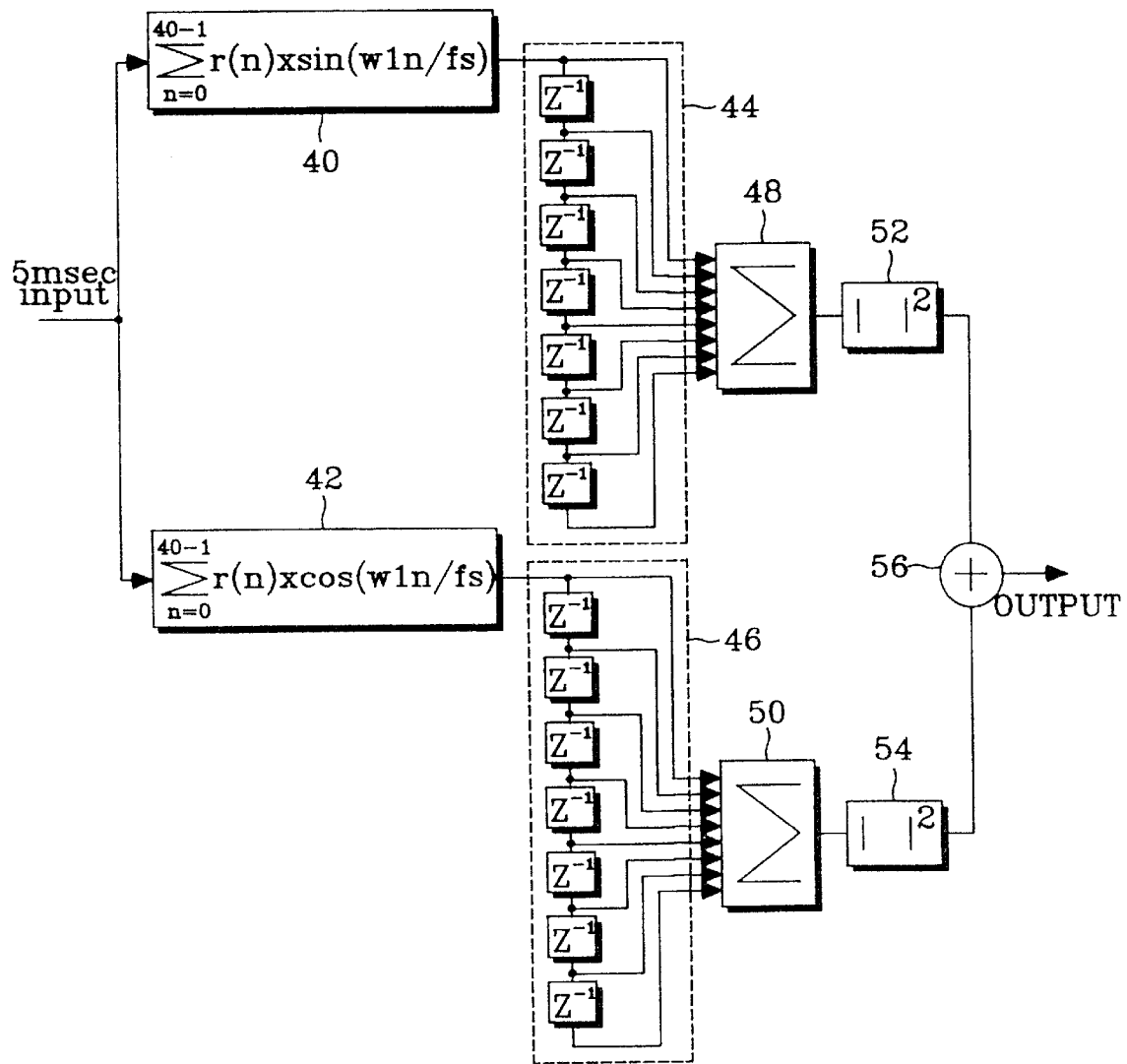
FIG. 6 is a block diagram showing a correlator constructed according to the principles of the present invention.

FIG. 6 is a block diagram showing a correlator constructed according to the principles of the present invention. The correlator of FIG. 6 includes first and second calculators 40 and 42, first and second buffering circuits 44 and 46, first and second adders 48 and 50, first and second absolute value squaring circuits 52 and 54, and a third adder 56. The output of the correlator, which operates as a non-coherent detector, is a value at a discrete time domain given by:

$$q^2 = \left[\sum_{n=0}^{N-1} r(n) \times \sin(2\pi f_1 n / f_s)\right]^2 + \left[\sum_{n=0}^{N-1} r(n) \times \cos(2\pi f_1 n / f_s)\right]^2 \quad (4)$$

In equation (4), if a sampling frequency is 8 KHz, $f_S$ is 8000 and N corresponds to 8000 T.

In the practice of the present invention, twenty-eight (28) correlators (each having a construction as shown in FIG. 6) exist on a single DSP chip to enable detection of all digits representable by a DTMF signal. Twenty-eight (28) reference frequencies are applied to the respective correlators.

The DSP chip is interrupted every five (5) milliseconds. Each correlator of the DSP chip correlates the input data of 5 milliseconds with sine reference data and cosine reference data. This sine reference data and the cosine reference data is generated from a table stored in the corresponding static random access memory (SRAM).

The table stored in the static random access memory (SRAM) is represented by the following Table 1. In order to detect a signal frequency of 697 Hz while satisfying the tolerance of the CCITT specification, reference frequencies of 690.646973 Hz and 703.296997 Hz are used. The reference frequency of 690.646973 Hz can make a continuous sine wave by using a data number of 139 from the table. That is, in calculating the data number of each table, if the sampling frequency is 8 KHz, sin (2π×690.646973×139/8000)=0 and cos (2π×690.646973×139/8000)=1. Therefore, the reference frequency of 690.646973 Hz can make a continuous sine wave by using the number 139. Table 1 below concretely shows the reference frequencies and the data numbers of each table used to detect each frequency of a DTMF signal. As shown in Table 1, the number of reference frequencies used is twenty-eight (28).

TABLE I

| DTMF Digit Frequency | Reference Frequency | Data Number |
| --- | --- | --- |
| 697 Hz | 690.646973 Hz | 139 |
|  | 703.296997 Hz | 91 |
| 770 Hz | 761.905029 Hz | 105 |
|  | 769.231018 Hz | 104 |
|  | 778.760986 Hz | 113 |
| 852 Hz | 842.104980 Hz | 114 |
|  | 852.458984 Hz | 122 |
|  | 862.744995 Hz | 112 |
| 941 Hz | 930.23297 Hz | 129 |
|  | 941.177002 Hz | 102 |
|  | 952.380005 Hz | 84 |
| 1209 Hz | 1192.983032 Hz | 114 |
|  | 1203.540039 Hz | 113 |
|  | 1214.286011 Hz | 112 |
|  | 1225.224976 Hz | 111 |
| 1336 Hz | 1318.680054 Hz | 91 |
|  | 1333.333984 Hz | 78 |
|  | 1342.281982 Hz | 149 |
|  | 1353.847046 Hz | 130 |
| 1477 Hz | 1454.543945 Hz | 99 |

TABLE I-continued

| DTMF Digit Frequency | Reference Frequency | Data Number |
| --- | --- | --- |
|  | 1470.588989 Hz | 136 |
|  | 1483.869995 Hz | 124 |
|  | 1496.402954 Hz | 139 |
| 1633 Hz | 1610.062012 Hz | 159 |
|  | 620.255005 Hz | 79 |
|  | 1632.654053 Hz | 98 |
|  | 1644.859985 Hz | 107 |
|  | 1657.657959 Hz | 111 |

Each correlator makes a correlation in the first and second calculators 40 and 42 according to the five (5) millisecond period using the data from Table I, and the correlated values are buffered in the buffering circuits 44 and 46, each having 8 buffers. The values stored in each buffer are added to each other in the first and second adders 48 and 50. Absolute values of the added values are squared in the absolute value squaring circuits 52 and 54, and the squared values are added to each other in the third adder 56. It takes 40 milliseconds (i.e., 5 milliseconds×8 buffers) to pass the correlator, and this time is within the range of the CCITT recommendation.

Referring back to FIG. 4, within the DSP chip, the power level of each reference frequency is obtained through the twenty-eight (28) correlators, as explained above. These power values are then applied to the low and high frequency maximum power detectors 24 and 26. The power values applied to the low frequency maximum power detector 24 are generated from the correlators corresponding to the reference frequencies of the low frequency band. The power values applied to the high frequency maximum power detector 26 are generated from the correlators corresponding to the reference frequencies of the high frequency band.

Therefore, the low frequency maximum power detector 24 detects the maximum power level among the power values of the low frequency band, and the high frequency maximum power detector 26 detects the maximum power level among the power values of the high frequency band. The low and high frequency maximum power detectors 24 and 26 respectively output a low frequency maximum power value $E_L$ and a high frequency maximum power value $E_H$ to the decider 30.

Moreover, the total power detector 28 outputs a total power value $E_T$ for the input signal r(t) to the decider 30 according to a period of 40 milliseconds. The total power value $E_T$ will be given by:

$$E_T = \sum_{n=0}^{N-1} (r(n))^2 \quad (5)$$

wherein N is 320.

To detect the frequency of a DTMF signal, the decider 30 compares the total power value $E_T$ and a ratio between the low frequency maximum power value $E_L$ and the high frequency maximum power value $E_H$, with a predetermined threshold value by using the following equation (6):

$$(E_L + E_H)/(160 \times E_T) \geq 0.7 \quad (6)$$

where 160 is a scaling factor. If a signal satisfies equation (6), the signal is determined to be a DTMF signal.

The decider 30 also performs the twist check. A DTMF signal exhibits a difference between the low frequency maximum power value $E_L$ and the high frequency maximum power value $E_H$. This difference should be within 6 dB. This condition can be expressed by the following equation (7):

$$|10 \times \log_{10}(E_H/E_L)| \leq 6 \qquad (7)$$

Furthermore, the decider 30 decides whether or not a detected DTMF signal is a pure sine wave by using the following equation (8).

$$\frac{P_{L35}}{49 \times P_{L5}} > 0.7 \qquad (8)$$

where $P_{L35}$ is a small value in the maximum output of the correlator of the high frequency band and that of the correlator of the low frequency band, and is an output of the correlator corresponding to 35 milliseconds (i.e., an output of 7 bins except a large value in the first and last of 8 bins, each corresponding to 5 milliseconds). In this disclosure, the term "bin" represents an output value of a buffer corresponding to a period of 5 milliseconds. $P_{L5}$ is an average value of the output of the correlator of 7 bins. The value of the correlator corresponding to 35 milliseconds is used to prepare the cases where a signal duration is started at the middle of a 5 millisecond period of the first bin (out of 8 total bins) and ended at the middle of a 5 millisecond period of the eighth bin.

Furthermore, the decider 30 implements the interruption check. That is, decider 30 checks for an interrupted DTMF signal by judging a power ratio between the detected power corresponding to 40 milliseconds and the power of the bin corresponding to 5 milliseconds given by:

$$00.63 \leq \frac{49 \times (B_L + B_H)}{140 \times P_{L35}} \leq 2.0 \qquad (9)$$

where $B_L$ and $B_H$ are the outputs of the correlators of the low frequency and high frequency, respectively, and $P_{L35}$ is the output of the correlator corresponding to 35 milliseconds.

Equation (9) is applied to each of 7 bins. If 7 bins satisfy equation (10), it is judged that the DTMF signal is not interrupted.

As described above, since the DTMF detector 12 of FIG. 3 can detect a DTMF signal of 15 channels with the use of one DSP chip, a DTMF signal of one E1 line can be processed in real-time by using two DSP chips. Therefore, the DTMF detector of the present invention requires less processing power in comparison with a prior art DTMF detector, and provides strong immunity for voice signals. In addition, in a talk-off rate test (which is a performance test for checking the number of voice checked to the DTMF signal when talking at a constant speed for 30 minutes, and is normal when the checked number is under 15) using Mitel CM7291 test tape, the DTMF detector of the present invention performs so that the number checked to the DTMF signal is 3 or less.

While there have been illustrated and described what are considered to be preferred embodiments of the present invention, it will be understood by those skilled in the art that various changes and modifications may be made, and equivalents made be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A dual tone multi-frequency detector, comprising:
   a pulse code modulation expanding unit for converting pulse code modulation data into linear data;
   a correlating unit comprised of a plurality of correlators, for correlating said linear data with a plurality of predetermined reference signals to generate a plurality of power values of a frequency band corresponding to dual tone multi-frequency signals;
   a total power detecting unit for detecting a total power value of said linear data;
   a low frequency maximum power detecting unit for detecting a maximum low frequency power value from said power values of a low frequency band generated by said correlating unit;
   a high frequency maximum power detecting unit for detecting a maximum high frequency power value from said power values of a high frequency band generated by said correlating unit; and
   a deciding unit for deciding whether or not said pulse code modulation data represents a dual tone multi-frequency signal in dependence upon said total power value, said maximum low frequency power value and said maximum high frequency power value.

2. The dual tone multi-frequency detector as claimed in claim 1, wherein each one of said correlators generates a corresponding one of said power values of a reference frequency of said dual tone multi-frequency signal band by using the following equation:

$$q^2 = \left[\int_0^T (\sin(w_2 t + \theta) \times \sin(w_1 t)) dt\right]^2 + \left[\int_0^T (\sin(w_2 t + \theta) \times \cos(w_1 t)) dt\right]^2$$

where $r(t)=\sin(w_2 t+\Theta)$, $r(t)$ represents said linear data, $q^2$ represents said corresponding power value of said reference frequency, $w_1$ represents said reference frequency, $w_2$ represents a frequency of said linear data $r(t)$, and $\Theta$ is a phase of said linear data $r(t)$.

3. The dual tone multi-frequency detector as claimed in claim 2, wherein said correlating unit comprises twenty-eight correlators.

4. The dual tone multi-frequency detector as claimed in claim 1, wherein each correlator of said correlating unit exhibits a non-coherent detector structure.

5. The dual tone multi-frequency detector as claimed in claim 1, wherein said dual tone multi-frequency detector is embodied as a single digital signal processing chip.

6. The dual tone multi-frequency detector as claimed in claim 3, wherein said dual tone multi-frequency detector is embodied as a single digital signal processing chip.

7. The dual tone multi-frequency detector as claimed in claim 1, wherein each one of said correlators comprises:
   first and second calculating units for correlating said linear data with said plurality of predetermined reference signals and generating first correlated values and second correlated values, respectively;
   first and second buffering circuits for receiving and buffering said first correlated values and said second correlated values, respectively;
   a first adder for adding said first correlated values to generate a first added value;
   a second adder for adding said second correlated values to generate a second added value;

a first absolute value squaring circuit for generating a first absolute value of said first added value, and squaring said first absolute value to generate a first output value;

a second absolute value squaring circuit for generating a second absolute value of said second added value, and squaring said second absolute value to generate a second output value; and a third adder for adding said first and second output values to generate one of said power values.

8. The dual tone multi-frequency detector as claimed in claim 6, wherein each one of said correlators comprises:

first and second calculating units for correlating said linear data with said plurality of predetermined reference signals and generating first correlated values and second correlated values, respectively;

first and second buffering circuits for receiving and buffering said first correlated values and said second correlated values, respectively;

a first adder for adding said first correlated values to generate a first added value;

a second adder for adding said second correlated values to generate a second added value;

a first absolute value squaring circuit for generating a first absolute value of said first added value, and squaring said first absolute value to generate a first output value;

a second absolute value squaring circuit for generating a second absolute value of said second added value, and squaring said second absolute value to generate a second output value; and a third adder for adding said first and second output values to generate one of said power values.

9. A method for detecting a dual tone multi-frequency signal, comprising the steps of:

converting pulse code modulation data representing a digital sample sequence formed from a plurality of tone signals of different frequencies into linear data;

correlating said linear data with a plurality of predetermined reference signals to detect a plurality of power values of a frequency band corresponding to a dual tone multi-frequency signal;

detecting a total power value of said linear data;

detecting a maximum low frequency power value from said power values of a low frequency band;

detecting a maximum high frequency power value from said power values of a high frequency band; and determining whether said pulse code modulation data represents said dual tone multi-frequency signal in dependence upon said total power value, said maximum low frequency power value and said maximum high frequency power value.

10. A dual tone multi-frequency detector, comprising:

a pulse code modulation expanding unit for converting pulse code modulation data representing a digital sample sequence formed from a plurality of tone signals of different frequencies into linear data;

a correlating unit comprised of a plurality of correlators, for correlating said linear data with a plurality of predetermined reference signal to generate a plurality of power values of a frequency band corresponding to a dual tone multi-frequency signal;

a total power detecting unit for detecting a total power value of said linear data;

a first power detecting unit for detecting a maximum low frequency power value from said power values of a low frequency band generated by said correlating unit;

a second power detecting unit for detecting a maximum high frequency power value from said power values of a high frequency band generated by said correlating unit; and a deciding unit for deciding whether said pulse code modulation data represents said dual tone multi-frequency signal by comparing a calculated value with a threshold value, said calculated value being equal to a first quantity divided by a second quantity, said first quantity being equal to said a sum of said maximum low frequency power value and said maximum high frequency power value, said second quantity being equal to said total power value multiplied by a predetermined scaling factor.

11. The dual tone multi-frequency detector as claimed in claim 10, wherein each one of said correlators generates a corresponding one of said power values of a reference frequency of said dual tone multi-frequency signal band by using the following equation:

$$q^2 = \left[\int_0^T (\sin(w_2 t + \theta) \times \sin(w_1 t)) dt\right]^2 + \left[\int_0^T (\sin(w_2 t + \theta) \times \cos(w_1 t)) dt\right]^2$$

where $r(t)=\sin(w_2 t+\Theta)$, $r(t)$ represents said linear data, $q^2$ represents said corresponding power value of said reference frequency, $w_1$ represents said reference frequency, $w_2$ represents a frequency of said linear data $r(t)$, and $\Theta$ is a phase of said linear data $r(t)$.

12. The dual tone multi-frequency detector as claimed in claim 11, wherein said correlating unit comprises twenty-eight correlators.

13. The dual tone multi-frequency detector as claimed in claim 10, wherein said correlating unit comprises twenty-eight correlators.

14. The dual tone multi-frequency detector as claimed in claim 10, wherein each correlator of said correlating unit exhibits a non-coherent detector structure.

15. The dual tone multi-frequency detector as claimed in claim 10, wherein said dual tone multi-frequency detector is embodied as a single digital signal processing chip.

16. The dual tone multi-frequency detector as claimed in claim 12, wherein said dual tone multi-frequency detector is embodied as a single digital signal processing chip.

17. The dual tone multi-frequency detector as claimed in claim 10, wherein said predetermined scaling factor equals 160.

18. The dual tone multi-frequency detector as claimed in claim 10, wherein each one of said correlators comprises:

first and second calculating units for correlating said linear data with said plurality of predetermined reference signals and generating first correlated values and second correlated values, respectively;

first and second buffering circuits for receiving and buffering said first correlated values and said second correlated values, respectively;

a first adder for adding said first correlated values to generate a first added value;

a second adder for adding said second correlated values to generate a second added value;

a first absolute value squaring circuit for generating a first absolute value of said first added value, and squaring said first absolute value to generate a first output value;

a second absolute value squaring circuit for generating a second absolute value of said second added value, and squaring said second absolute value to generate a second output value; and a third adder for adding said first and second output values to generate one of said power values.

19. The dual tone multi-frequency detector as claimed in claim 16, wherein each one of said correlators comprises:

first and second calculating units for correlating said linear data with said plurality of predetermined reference signals and generating first correlated values and second correlated values, respectively;

first and second buffering circuits for receiving and buffering said first correlated values and said second correlated values, respectively;

a first adder for adding said first correlated values to generate a first added value;

a second adder for adding said second correlated values to generate a second added value;

a first absolute value squaring circuit for generating a first absolute value of said first added value, and squaring said first absolute value to generate a first output value;

a second absolute value squaring circuit for generating a second absolute value of said second added value, and squaring said second absolute value to generate a second output value; and a third adder for adding said first and second output values to generate one of said power values.

20. A method for detecting a dual tone multi-frequency signal, comprising the steps of:

converting pulse code modulation data representing a digital sample sequence formed from a plurality of tone signals of different frequencies into linear data;

correlating said linear data with a plurality of predetermined reference signals to detect a plurality of power values of a frequency band corresponding to a dual tone multi-frequency signal;

detecting a total power value of said linear data;

detecting a maximum low frequency power value from said power values of a low frequency band;

detecting a maximum high frequency power value from said power values of a high frequency band; and determining whether said pulse code modulation data represents said dual tone multi-frequency signal by comparing a calculated value with a threshold value, said calculated value being equal to a first quantity divided by a second quantity, said first quantity being equal to said a sum of said maximum low frequency power value and said maximum high frequency power value, said second quantity being equal to said total power value multiplied by a predetermined scaling factor.

* * * * *